US008386847B2

(12) United States Patent
Garimella et al.

(10) Patent No.: US 8,386,847 B2
(45) Date of Patent: *Feb. 26, 2013

(54) APPARATUS, SYSTEM AND METHOD FOR VOLUME-LEVEL RESTORATION OF CLUSTER SERVER DATA

(75) Inventors: Neeta Garimella, San Jose, CA (US); Delbert B. Hoobler, III, Horseheads, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,435

(22) Filed: Apr. 25, 2011

(65) Prior Publication Data

US 2011/0202507 A1   Aug. 18, 2011

Related U.S. Application Data

(63) Continuation of application No. 11/625,428, filed on Jan. 22, 2007, now Pat. No. 7,992,036.

(51) Int. Cl.
*G06F 11/00* (2006.01)
*G06F 11/16* (2006.01)

(52) U.S. Cl. ............ 714/15; 714/19; 711/203; 707/649; 707/657

(58) Field of Classification Search .................... 714/15, 714/19; 711/203, 209; 707/649, 657
See application file for complete search history.

(56) References Cited

U.S. PATENT DOCUMENTS

| | | | |
|---|---|---|---|
| 6,047,294 A | 4/2000 | Deshayes et al. | |
| 6,216,211 B1* | 4/2001 | McBrearty et al. | 711/162 |
| 6,490,598 B1 | 12/2002 | Taylor | |
| 6,711,559 B1* | 3/2004 | Kogota et al. | 1/1 |
| 6,718,446 B1 | 4/2004 | Peters et al. | |
| 6,799,258 B1 | 9/2004 | Linde | |
| 6,865,655 B1 | 3/2005 | Andersen | |
| 7,165,145 B2 | 1/2007 | Lam | |
| 7,222,172 B2* | 5/2007 | Arakawa et al. | 709/224 |
| 7,237,076 B2* | 6/2007 | Nakano et al. | 711/162 |
| 7,552,358 B1* | 6/2009 | Asgar-Deen et al. | 714/6.1 |
| 7,673,096 B2* | 3/2010 | Aoyama | 711/112 |
| 2003/0079102 A1 | 4/2003 | Lubbers et al. | |
| 2004/0139128 A1 | 7/2004 | Becker et al. | |
| 2005/0060607 A1 | 3/2005 | Kano | |
| 2005/0108292 A1 | 5/2005 | Burton et al. | |
| 2005/0125609 A1* | 6/2005 | Satoyama et al. | 711/114 |
| 2005/0278391 A1 | 12/2005 | Spear et al. | |
| 2006/0047924 A1 | 3/2006 | Aoshima et al. | |
| 2006/0168397 A1 | 7/2006 | Wightwick et al. | |
| 2006/0242380 A1 | 10/2006 | Korgaonkar et al. | |
| 2007/0220308 A1 | 9/2007 | Yeung et al. | |

OTHER PUBLICATIONS

"Fast Recovery using Transportable Shadow Copied Volumes", downloaded on Apr. 23, 2010, know about since Nov. 28, 2006 http://msdn.microsoft.com/library/default.asp?url=/library/en-us/vss/base/fast_recovery_using_transportable_shadow_copied_volumes.asp.
"VSS Restore Considerations", downloaded on Jan. 19, 2007, know about since Nov. 28, 2006, www.microsoft.com.
"Database Back-Up and Restore", downloaded on Nov. 28, 2006, know about since Nov. 28, 2006, wwww.microsoft.com.

(Continued)

*Primary Examiner* — Joseph Schell
(74) *Attorney, Agent, or Firm* — Kunzler Law Group, PC

(57) ABSTRACT

A setup module saves disk signatures identifying cluster disks for at least one source volume to a device distinct from the cluster disks. A copy module copies data with a volume-level restore from at least one snapshot volume to the at least one source volume, overwriting the disk signatures identifying the cluster disks so that the cluster disks cannot be accessed. A reset module rewrites the saved disk signatures to the cluster disks.

20 Claims, 6 Drawing Sheets

OTHER PUBLICATIONS

"Using Shadow Copies of Shared Folders", downloaded on Nov. 28, 2006, know about since Nov. 28, 2006, www.microsoft.com.

"Preforming a VSS Resore Using VxSNAP with the "–r" Option on a Server Using Vertias Storage Foundation™ 4.3 for Window Fails", downloaded on Nov. 28, 2006, know about since Nov. 28, 2006, http://seer.support.veritas.com/docs/279365.htm.

Microsoft TechNet: What is Volume Shadow Copy Service? http://technet.microsoft.com/en-us/library/cc757854 (WS.10).aspx, Plublished Mar. 28, 2003.

Bad Blocks from brunolinux.com http://www.brunolinux.com/04-The_File_System/Bad_Blocks.html Dec. 12, 2005.

Check your Disks with Badblocks from pantz.org http://www.pantz.org/software/badblocks/badblocksusage.html Aug. 17, 2005.

FSCK Command—What does it Check/Repair? by user Kelam Magnus http://www.unix.com/unix-advanced-expert-users/5552-fsck-command-what-does-check-repair.html Apr. 5, 2002.

Man pages section 1M: System Administration Commands FSCK from sun.com http://docs.sun.com/app/docs/doc816-0211/6m6nc66qt?a=view Aug. 7, 2001.

* cited by examiner

APPARATUS, SYSTEM AND METHOD FOR VOLUME-LEVEL RESTORATION OF CLUSTER SERVER DATA

CROSS-REFERENCE TO RELATED APPLICATIONS

This is a continuation application of and claims priority to U.S. patent application Ser. No. 11/625,428 entitled "APPARATUS, SYSTEM, AND METHOD FOR VOLUME-LEVEL RESTORATION OF CLUSTER SERVER DATA" and filed on Jan. 22, 2007 for Neeta Garimella et al., which is incorporated herein by reference.

FIELD

This invention relates to restoring data and more particularly relates to restoring cluster server data at a volume-level.

BACKGROUND

Description of the Related Art

A data processing system may employ cluster servers for critical data processing tasks. Two or more servers may be configured as cluster servers. Each cluster server may monitor other cluster servers. If a first cluster server hangs or otherwise is unable to complete one or more tasks, a second cluster server may identify the problem and resume processing functions for the first cluster server.

Cluster servers often employ one or more cluster disks. The cluster disks may store data for each of the cluster servers. The storage capacity of the cluster disks may be divided among one or more logical volumes. The cluster disk logical volumes are referred to herein as source volumes.

The source volumes and cluster disks may employ a number of data locks and other safeguards to assure that data used by a first cluster server is not overwritten by a second cluster server. As a result, the plurality of cluster servers may share the source volumes and the cluster disks.

Because cluster servers typically perform critical tasks, a snapshot of the data stored on the source volumes is often backed up to one or more snapshot volumes. A plurality of snapshot instances may be stored on the snapshot volumes.

Occasionally, the cluster servers may require that data from a snapshot instance be restored to the source volumes. Unfortunately, because of the large numbers of discrete files and the large amount of data that must be restored, recovering data from the snapshot instance may be a lengthy process. Yet because of the critical nature of the tasks performed by the cluster server, a lengthy recovery process may be unacceptable.

SUMMARY

From the foregoing discussion, there is a need for an apparatus, system, and method that restores cluster server data at volume level. Beneficially, such an apparatus, system, and method would allow cluster server data to be rapidly restored, minimizing service outages.

The present invention has been developed in response to the present state of the art, and in particular, in response to the problems and needs in the art that have not yet been fully solved by currently available data restoration methods. Accordingly, the present invention has been developed to provide an apparatus, system, and method for restoring cluster server data that overcome many or all of the above-discussed shortcomings in the art.

The apparatus to restore cluster server data at a volume level is provided with a first cluster server. In one embodiment, the first cluster server comprises a setup module, a copy module, and a reset module. The setup module saves disk signatures identifying cluster disks for at least one source volume to a device distinct from the cluster disks. The copy module copies data with a volume-level restore from at least one snapshot volume to the at least one source volume, overwriting the disk signatures identifying the cluster disks so that the cluster disks cannot be accessed. The reset module rewrites the saved disk signatures to the cluster disks.

A system of the present invention is also presented to restore cluster server data. The system may be embodied in a cluster server. In particular, the system, in one embodiment, includes a plurality of cluster servers, cluster disks, and snapshot disks.

The cluster disks include at least one source volume that stores data for the cluster servers. The snapshot disks include at least one volume that stores a backup instance of the at least one source volume.

A first cluster server of the plurality of cluster servers includes a setup module, a copy module, and a reset module. The setup module saves disk signatures identifying cluster disks for the at least one source volume to a device distinct from the cluster disks. The copy module copies data with a volume-level restore from at least one snapshot volume to the at least one source volume, overwriting the disk signatures identifying the cluster disks so that the cluster disks cannot be accessed. The reset module rewrites the saved disk signatures to the cluster disks.

A method of the present invention is also presented for restoring cluster server data. The method in the disclosed embodiments substantially includes the steps to carry out the functions presented above with respect to the operation of the described apparatus and system.

A setup module saves disk signatures identifying cluster disks for at least one source volume to a device distinct from the cluster disks. A copy module copies data with a volume-level restore from at least one snapshot volume to the at least one source volume, overwriting the disk signatures identifying the cluster disks so that the cluster disks cannot be accessed. A reset module rewrites the saved disk signatures to the cluster disks.

References throughout this specification to features, advantages, or similar language does not imply that all of the features and advantages that may be realized with the present invention should be or in any single embodiment of the invention. Rather, language referring to the features and advantages is understood to mean that a specific feature, advantage, or characteristic described in connection with an embodiment is included in the at least one embodiment of the present invention. Thus, discussion of the features and advantages, and similar language, throughout this specification may, but do not necessarily, refer to the same embodiment.

The embodiment of the present invention restores cluster server data. In addition, the present invention may reduce the time required to restore the data, shortening the time the data is unavailable to the cluster servers. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristics described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
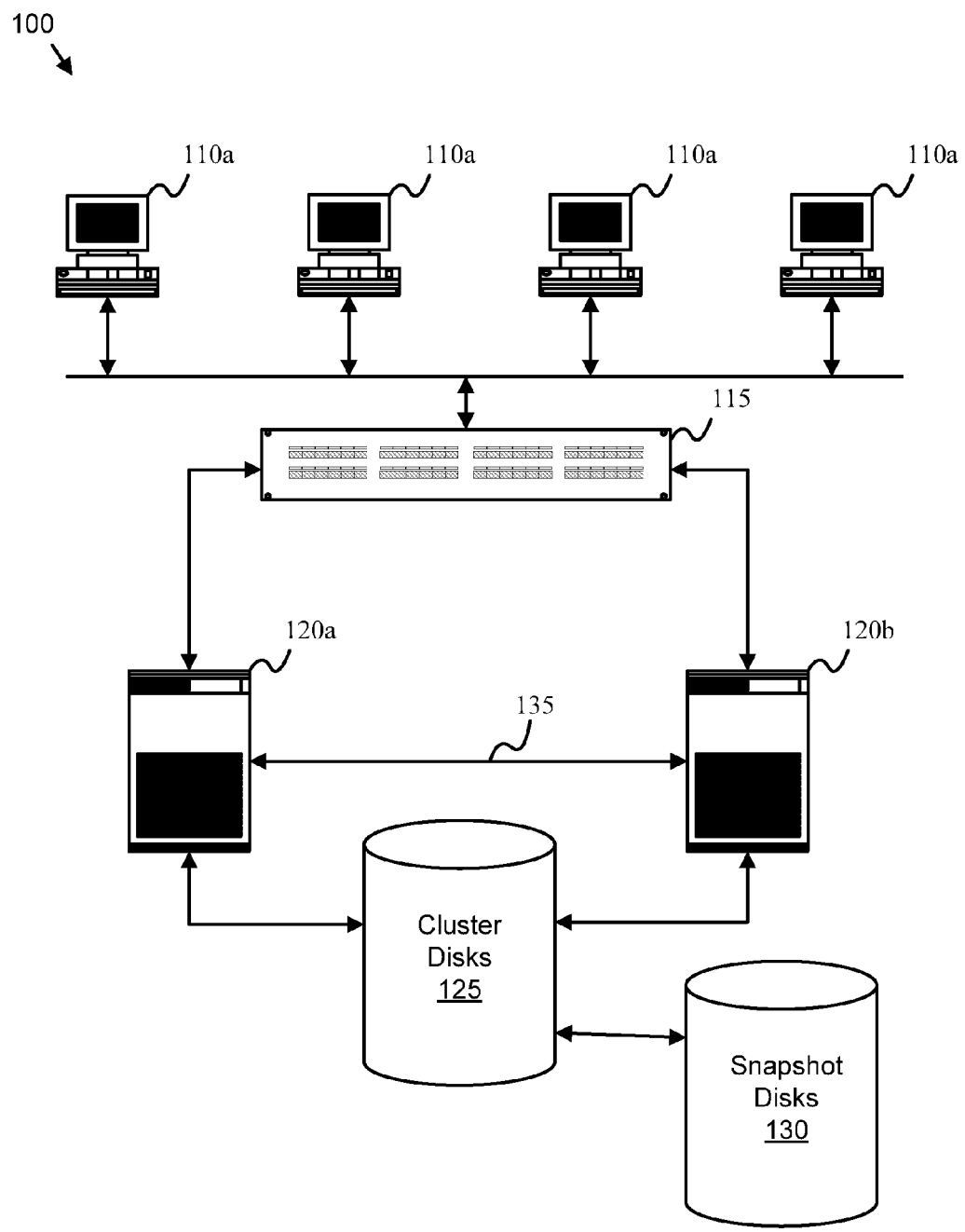
FIG. 1 is a schematic block diagram illustrating one embodiment of a cluster server system in accordance with the present invention.

FIG. 1 is a schematic block diagram illustrating one embodiment of a cluster server system 100 in accordance with the present invention. The cluster server system 100 includes one or more hosts 110, a cluster connection 115, one or more cluster servers 120, cluster disks 125, and snapshot disks 130. The cluster disks 125 and snapshot disks 130 are representative of one or more hard disk drives configured as logical unit numbers (LUNS). One of skill in the art will recognize that the cluster disks 125 and snapshot disks 130 may also be configured as one or more optical storage devices, holographic storage devices, semiconductor storage devices, and the like. Although for simplicity two cluster servers 120 and one cluster connection 115 are shown, any number of cluster servers 120 and cluster connections 115 may be employed.

In one embodiment, the cluster servers 120 execute MICROSOFT® Cluster Server. The operating system may include Volume Shadow Copy Service application program interfaces as are well known to those of skill in the art.

The cluster servers 120 may provide computing services for the hosts 110. For example, the cluster servers 120 may execute tasks including application programs, data managements programs, and the like. The cluster servers 120 work closely together.

The hosts 110 may be computer workstations, servers, mainframe computers, and the like. The hosts 110 may communicate with the cluster servers 120 through the cluster connection 115. The cluster connection 115 may be a router, a server, or the like. The cluster servers 120 may also communicate through a private cluster connection 135.

The cluster servers 120 may provide high availability computing services. Thus if a first cluster server 120a is unavailable, a second cluster server 120b may be used in place of the first cluster server 120a. The cluster servers 120 may also work together to balance data processing tasks among the cluster servers 120. Thus if the first cluster server 120a is processing too many tasks, some tasks may be shifted to the second cluster server 120b. The cluster servers 120 may also monitor each other, so that if the first cluster server 120a fails, the second cluster server 120b may assume the computing tasks of the first cluster server 120a.

The cluster servers 120 may each store data to the cluster disks 125, facilitating the sharing of tasks among the cluster servers 120. The cluster disks 125 may be organized as one or more source volumes. The cluster server system 100 may employ locks and other logical restrictions to prevent the first cluster server 120a from overwriting data of the second cluster server 120b.

Because cluster server systems 100 typically process important tasks, the data of the cluster disks 125 may be backed up to the snapshot disks 130. The snapshot disks 130 may also be organized as one or more snapshot volumes. If data of one or more source volumes is ever lost and/or corrupted, a backup instance of the data may be recovered from the snapshot volumes.

In one embodiment, the cluster disks 125 and/or the snapshot disks 130 are organized as a storage area network (SAN). Alternatively, the cluster disks 125 and the snapshot disks 130 may be organized within a single SAN.

Unfortunately, copying a large amount of data and large number of files from the snapshot disks 130 to the cluster disks 125 may require an excessive time interval. As a result, the cluster server system 100 may be unable to provide computing services or provide computing services at a reduced level. The present invention efficiently restores the data from the snapshot volumes to the source volumes.

Figure 2:
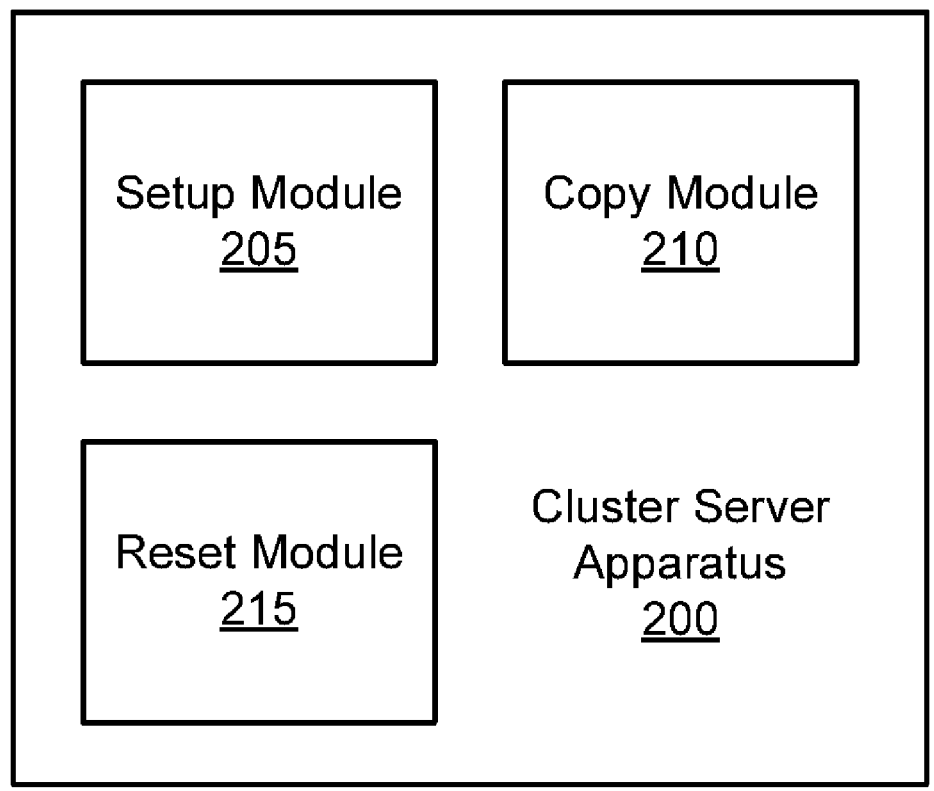
FIG. 2 is a schematic block diagram illustrating one embodiment of a cluster server apparatus of the present invention.

FIG. 2 is a schematic block diagram illustrating one embodiment of a cluster server apparatus 200 of the present invention. The apparatus 200 may be embodied in one or more computer program products executing on a cluster server 120 of FIG. 1. The description of the apparatus 200 refers to elements of FIG. 1, like numbers referring to like elements.

In one embodiment, the setup module 205 prepares an application for recovery. The application executes on a cluster server 120. The setup module 205 further directs the application to quiesce a data set of a source volume of a cluster server 120. The source volume may reside on the cluster disks 125.

The setup module 205 opens the source volume. In addition, the setup module 205 flushes each buffer of the source volume and closes the source volume. The buffers may temporarily store data written to the source volume and/or read from the source volume. The setup module 205 further disables file system checks for the cluster disks 125 associated with the source volume. In addition, the setup module 205 saves disk signatures of the cluster disks 125 and disables device-level checks for the cluster disks 125 as will be described hereafter.

The copy module 210 copies data with a volume-level restore from a snapshot volume to the source volume. The reset module 215 rewrites the saved disk signatures to the cluster disks 125. In addition, the reset module 215 re-enables the device-level checks for the cluster disks 125 and resets at least one volume attribute on the at least one source volume.

In one embodiment, the reset module 215 unmounts the source volume, mounts the source volume, and re-enables the file system checks for the cluster disks 125. In addition, the reset module may direct the application to run a recovery operation. The cluster server apparatus 200 allows the data to be restored to the source volume.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
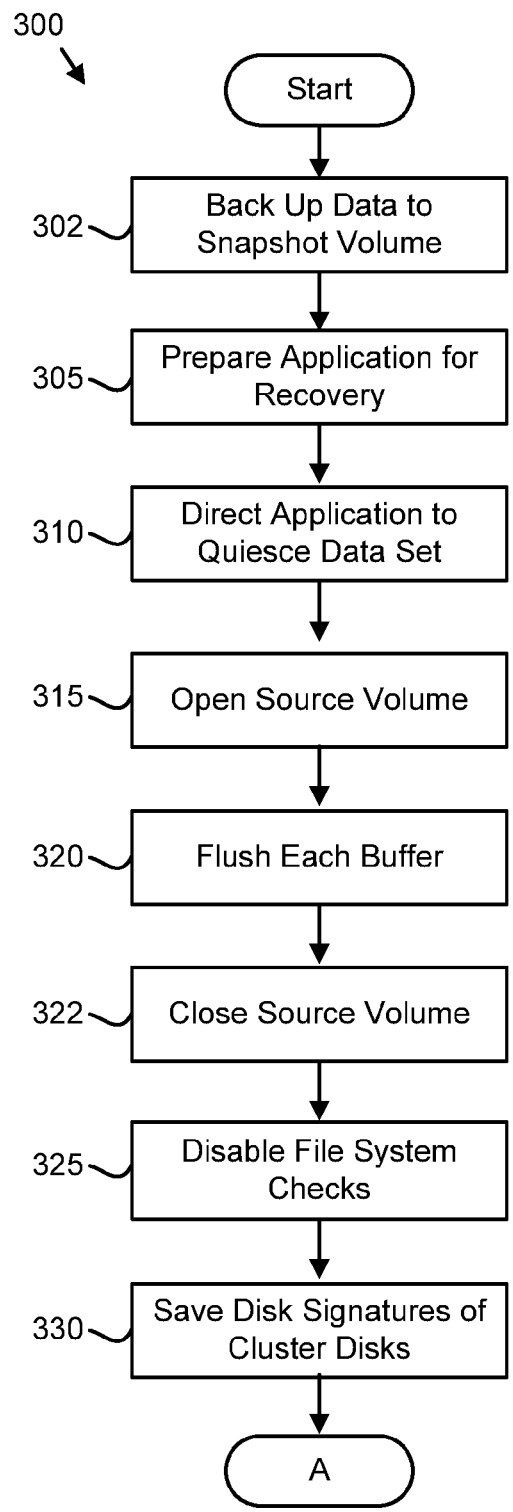
FIGS. 3 and 4 are a schematic flow chart diagram illustrating one embodiment of a data restoration method of the present invention.
Figure 4:
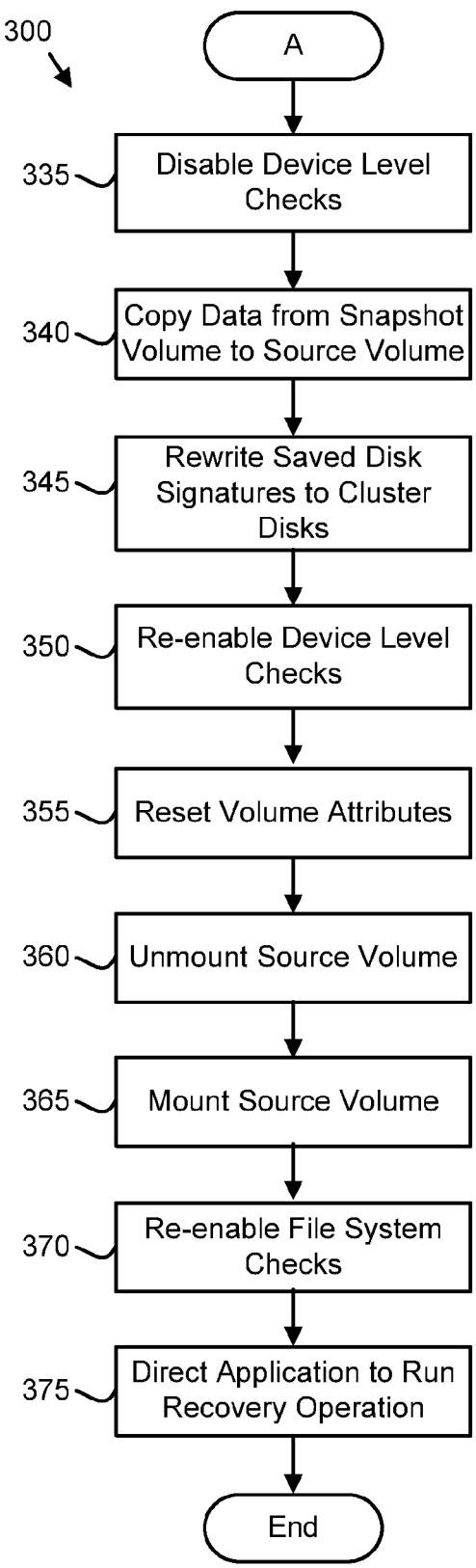

FIGS. 3 and 4 are a schematic flow chart diagram illustrating one embodiment of a data restoration method 300 of the present invention. The data restoration method 300 substantially includes the steps to carry out the functions presented above with respect to the operation of the described apparatus and system of FIGS. 1 and 2. In one embodiment, the method is implemented with a computer program product comprising a computer readable medium having a computer readable program. A computer such as a cluster server 120 may execute the computer readable program.

The data restoration method 300 begins, and in one embodiment, the copy module 210 backs up 302 data from the at least one source volume to the at least one snapshot volume. In a certain embodiment, there is a corresponding snapshot volume for each source volume. The copy module 210 may regularly back up 302 data according to the policy. For example, the copy module 210 may back up 302 data hourly.

The setup module 205 may prepare 305 an application for recovery. The application may be a database application program, a web services application, and the like. In one embodiment, the application is MICROSOFT® Exchange Server.

The setup module 205 further directs 310 the application to quiesce a data set of the at least one source volume of a cluster server 120. In addition, the setup module 205 may dismount a data set used by the application and residing on a source volume.

The setup module 205 opens 315 the at least one source volume. For example, the source volume may be configured to receive data from the at least one snapshot volume, wherein the data from the snapshot volume may overwrite the current data of the at least one source volume.

The setup module 205 flushes 320 each buffer of the at least one source volume. The buffers may be configured as a semiconductor memory, a reserved section of a hard disk drive, and the like. The opening 315 of the at least one source volume may enable the flushing 320 of the buffers. In addition, the setup module 205 closes 322 the at least one source volume.

The setup module 205 further disables 325 file system checks for the cluster disks 125 associated with the source volume. The file system checks may determine if the cluster disks 125 are functioning. In one embodiment, the setup module 205 disables 325 the file system checks by placing the cluster disks 125 in a normal cluster maintenance mode, such that functions such as "looksalive," "isalive," and the like cannot be used. The setup module 205 further saves 330 disk signatures of the cluster disks 125 as will be described hereafter.

Turning now to FIG. 4, the setup module 205 disables 335 device-level checks for the cluster disks 125. In one embodiment, the setup module 205 disables 335 the device-level checks by placing the cluster disks 125 in an extended maintenance mode. With the cluster disks 125 in extended maintenance mode, a cluster server 120 may be unable to write to the cluster disks 125.

The copy module 210 copies 340 data with a volume-level restore from the at least one snapshot volume to the at least one source volume. In one embodiment, the copy module 210 overwrites each source volume with the data of a snapshot volume. The copy module 210 may rapidly copy 340 the data using one or more methods as is well know to those of skill in the art. In addition, in some embodiments such as an International Business Machines Corporation (IBM) SAN Volume Controller, IBM DS6000-series, and IBM DS8000-series, the source volumes can be used before the data copy completes.

The reset module 215 rewrites 345 the saved disk signatures to the cluster disks 125 as will be described hereafter. In addition, the reset module 215 may re-enable 350 the device-level checks for the cluster disks 125. In one embodiment, the reset module 215 re-enables 350 the device-level checks by removing the cluster disks 125 from the extended maintenance mode.

The reset module 215 further resets 355 the at least one volume attribute on the at least one source volume. In one embodiment, resetting 355 the at least volume attribute makes the at least one source volumes writable. The reset module 215 unmounts 360 the at least one source volume. In addition, the reset module 215 mounts 365 the at least one source volume. Unmounting 360 and mounting 365 the at least one source volume may enable the cluster servers 120 to write to the source volumes.

The reset module 215 re-enables 370 the file system checks for the cluster disks 125. In one embodiment, the reset module 215 removes the cluster disks 125 from the normal cluster maintenance mode to re-enable 370 file system checks. In addition, the reset module 215 may direct 375 the application to run a recovery operation. For example, the reset module 215 may direct 375 MICRSOFT® Exchange Server to mount application databases.

The data restoration method 300 restores the cluster server data. By preparing the source volumes for receiving a volume-level restore, the data restoration method 300 improves the restoration of data.

Figure 5:
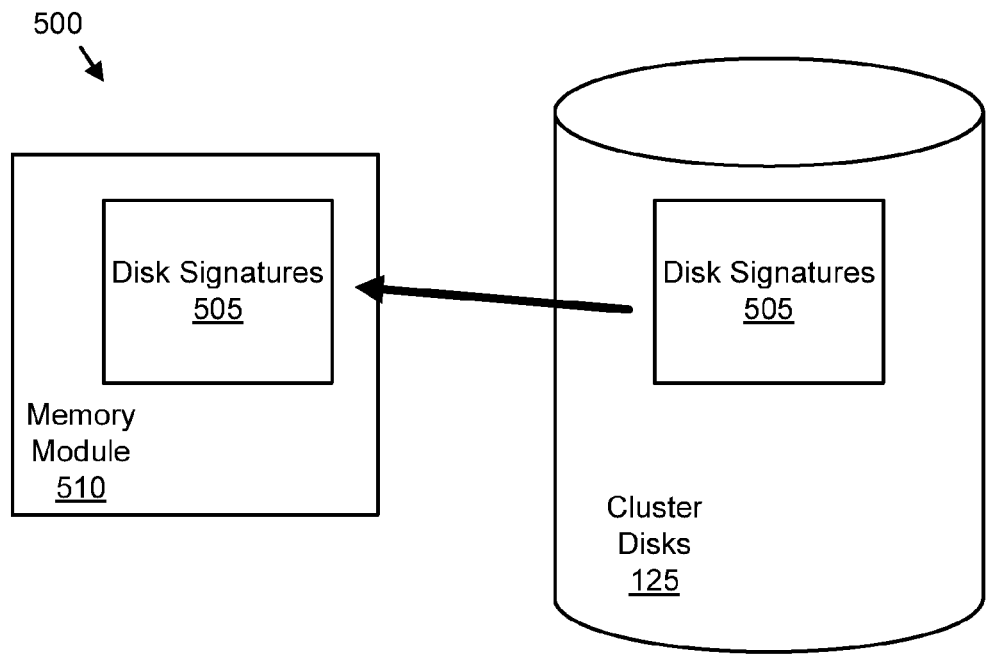
FIG. 5 is a schematic block diagram illustrating one embodiment of saving disk signatures of the present invention.

FIG. 5 is a schematic block diagram illustrating one embodiment of saving disk signatures 500 of the present invention. The depiction of saving disk signatures 500 illustrates step 330 of FIG. 3. In addition, the description of saving disk signatures 500 refers to elements of FIGS. 1-3, like numbers referring to like elements.

The cluster disks 125 comprise disk signatures 505. The disk signatures 505 identify the cluster disks 125. Each storage device of the cluster disks 125 may have a disk signature 505. The setup module 205 saves 330 the disk signatures 505 to a memory module 510. The memory module 510 may be a dynamic random access memory (DRAM) residing in a cluster server 120.

With the disk signatures 505 stored 330 to the memory module 510, the copy module 210 may rapidly copy 340 data from the snapshot disks 130 to the cluster disks 125. Although the disk signatures 505 may be overwritten during the copy 340 operation, the disk signatures 505 are still available for restoration to the cluster disks 125 as will be described hereafter.

Figure 6:
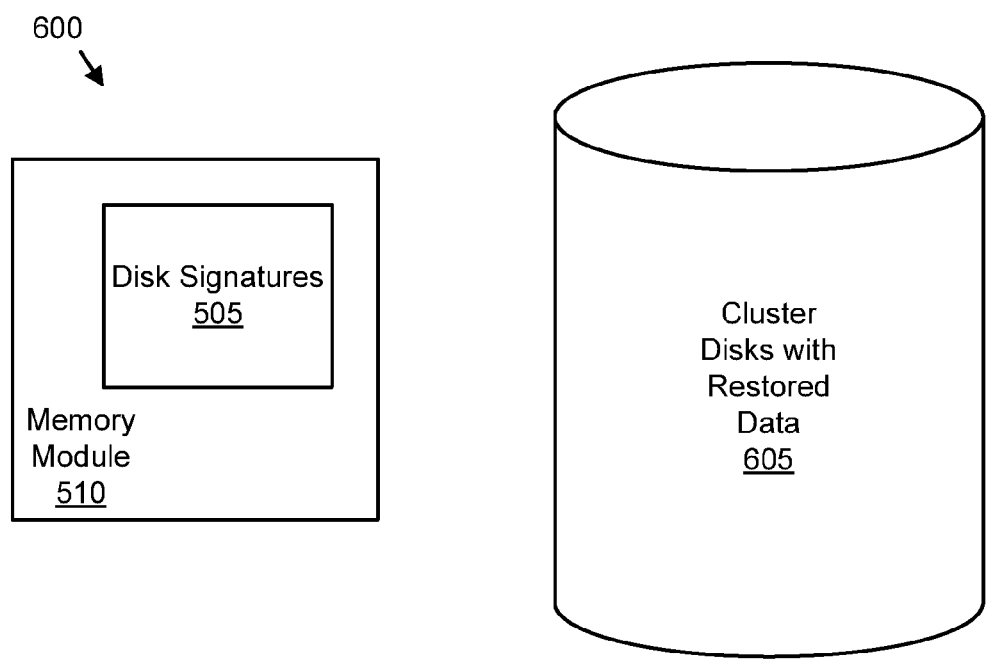
FIG. 6 is a schematic block diagram illustrating one embodiment of restored data of the present invention.

FIG. 6 is a schematic block diagram illustrating one embodiment of restored data 600 of the present invention. The memory module 510 is of FIG. 5 is shown. The cluster disks 125 of FIG. 5 is also shown overwritten with the data from the snapshot disks 130, referred to herein as cluster disks with restored data 605. The description of the restored data 600 refers to elements of FIGS. 1-5, like numbers referring to like elements.

The cluster disks with restored data 605 include the data needed by the cluster servers 120. However, the cluster servers 120 may not access the data as the cluster disks with restored data 605 do not have the disk signatures of the snapshot disks 130.

Figure 7:
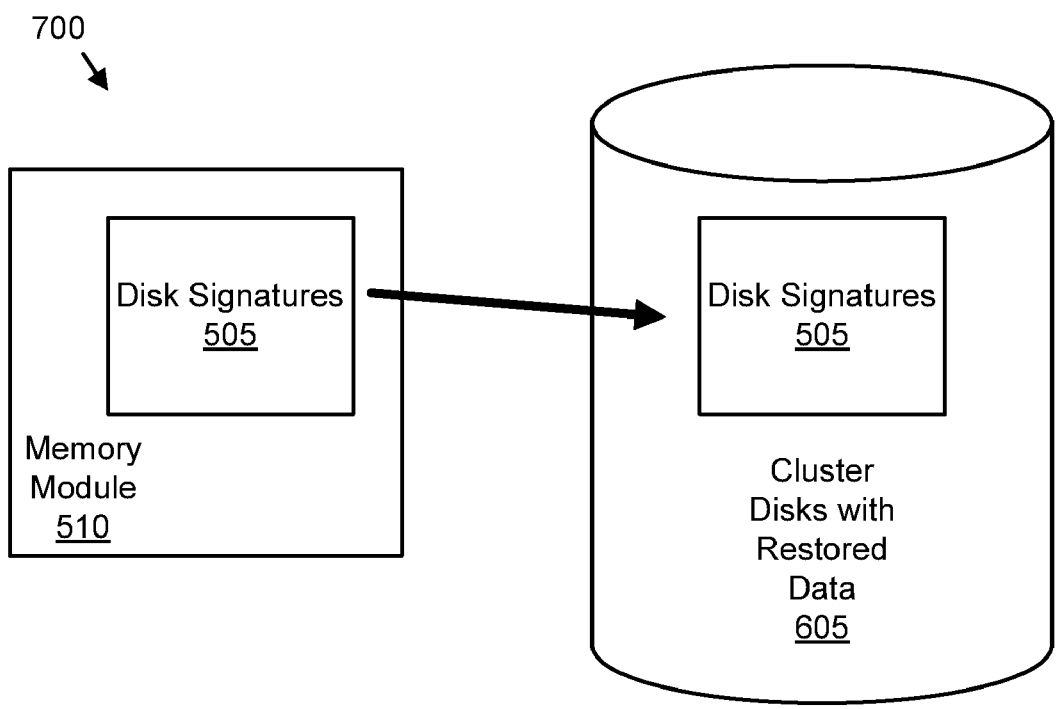
FIG. 7 is a schematic block diagram illustrating one embodiment of rewriting disk signatures of the present invention.

FIG. 7 is a schematic block diagram illustrating one embodiment of rewriting disk signatures 700 of the present invention. The memory module 510 and cluster disks with restored data 605 of FIG. 6. The description of rewriting the disk signatures 700 refers to elements of FIGS. 1-6, like numbers referring to like elements.

The reset module 215 rewrites 345 the saved disk signatures 505 to the cluster disks with restored data 605. With the disk signatures 505, the cluster disks with restored data 605 can be accessed by the cluster servers 120, completing the restoration of cluster server data.

The present invention efficiently restores data for cluster servers 120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to restore cluster server data at a volume level, the apparatus comprising:
   a first cluster server of a plurality of cluster servers, the first cluster server comprising a memory device storing executable code and a processor executing the executable code, the executable code comprising:
      a setup module saving disk signatures identifying cluster disks for at least one source volume to a device distinct from the cluster disks;
      a copy module copying data with a volume-level restore from at least one snapshot volume to the at least one source volume, overwriting the disk signatures identifying the cluster disks so that the cluster disks cannot be accessed; and
      a reset module rewriting the saved disk signatures to the cluster disks.

2. The apparatus of claim 1, the setup module further preparing an application for recovery, disabling file system checks by placing the cluster disks in a normal cluster maintenance mode such that a looksalive function cannot be used, and disabling device-level checks for the cluster disks by placing the cluster disks in an extended maintenance mode.

3. The apparatus of claim 2, the reset module further directing the application to run a recovery operation.

4. The apparatus of claim 3, wherein the application is a MICROSOFT® Exchange Server.

5. The apparatus of claim 3, the setup module further directing the application to quiesce a data set of the at least one source volume.

6. The apparatus of claim 1, the setup module further opening the at least one source volume for a volume-level restore, flushing each buffer for the at least one source volume; closing the at least one source volume, unmounting the at least one source volume, disabling file system checks for the cluster disks, disabling device-level checks for the cluster disks, and mounting the at least one source volume, and the reset module further re-enabling the file system checks for the cluster disks, re-enabling the device-level checks for the cluster disks, and resetting at least one volume attribute on the at least one source volume.

7. A memory device storing executable code executed on a processor embodied in a first cluster server of a plurality of cluster servers to:
- save disk signatures identifying cluster disks for at least one source volume to a device distinct from the cluster disks;
- copy data for a volume-level restore from at least one snapshot volume to the at least one source volume, overwriting the disk signatures identifying the cluster disks so that the cluster disks cannot be accessed; and
- rewrite the saved disk signatures to the cluster disks.

8. The memory device of claim 7, the executable code further preparing an application for recovery, disabling the file system checks by placing the cluster disks in a normal cluster maintenance mode such that a looksalive function cannot be used, and disabling the device-level checks for the cluster disks by placing the cluster disks in an extended maintenance mode.

9. The memory device of claim 8, the executable code further directing the application to quiesce a data set of the at least one source volume.

10. The memory device of claim 8, the executable code further directing the application to run a recovery operation.

11. The memory device of claim 8, the executable code further:
- opening the at least one source volume for a volume-level restore;
- flushing each buffer for the at least one source volume;
- closing the at least one source volume;
- unmounting the at least one source volume;
- disabling file system checks for the cluster disks;
- disabling device-level checks for the cluster disks;
- mounting the at least one source volume;
- re-enabling the file system checks for the cluster disks;
- re-enabling the device-level checks for the cluster disks; and
- resetting at least one volume attribute on the at least one source volume.

12. The memory device of claim 7, the executable code further backing up the data to the at least one snapshot volume using Volume Shadow Copy Service application program interfaces.

13. A system comprising:
- a plurality of cluster servers;
- cluster disks comprising at least one source volume storing data for the plurality of cluster servers;
- snapshot disks comprising at least one snapshot volume storing a backup instance of the at least one source volume;
- a first cluster server of the plurality of cluster servers comprising:
  - a setup module saving disk signatures identifying cluster disks for the at least one source volume to a device distinct from the cluster disks;
  - a copy module copying data with a volume-level restore from the at least one snapshot volume to the at least one source volume, overwriting the disk signatures identifying the cluster disks so that the cluster disks cannot be accessed; and
  - a reset module rewriting the saved disk signatures to the cluster disks.

14. The system of claim 13, the setup module further preparing an application for recovery, disabling file system checks by placing the cluster disks in a normal cluster maintenance mode such that a looksalive function cannot be used, and disabling device-level checks for the cluster disks by placing the cluster disks in an extended maintenance mode.

15. The system of claim 14, the reset module further directing the application to run a recovery operation.

16. The system of claim 14, the setup module further directing the application to quiesce a data set of the at least one source volume.

17. The system of claim 13, the setup module further opening the at least one source volume for a volume-level restore, flushing each buffer for the at least one source volume; closing the at least one source volume, unmounting the at least one source volume, disabling file system checks for the cluster disks, disabling device-level checks for the cluster disks, and mounting the at least one source volume, and the reset module further re-enabling the file system checks for the cluster disks, re-enabling the device-level checks for the cluster disks, and resetting at least one volume attribute on the at least one source volume.

18. A method for deploying computer infrastructure, comprising integrating executable code stored in a memory device into a first cluster server of a plurality of cluster servers, wherein the code in combination with the first cluster server performs the following:
- saving disk signatures identifying cluster disks for at least one source volume to a device distinct from the cluster disks;
- copying data for a volume-level restore from at least one snapshot volume to the at least one source volume, overwriting the disk signatures identifying the cluster disks so that the cluster disks cannot be accessed; and
- rewriting the saved disk signatures to the cluster disks.

19. The method of claim 18, wherein the method further comprises preparing an application for recovery, disabling file system checks by placing the cluster disks in a normal cluster maintenance mode such that a looksalive function cannot be used, and disabling device-level checks for the cluster disks by placing the cluster disks in an extended maintenance mode.

20. The memory device of claim 19, the method further comprising directing the application to quiesce a data set of the at least one source volume.

* * * * *